United States Patent [19]
Cain et al.

[11] Patent Number: 4,705,717
[45] Date of Patent: Nov. 10, 1987

[54] TENT LINERS/WALLS FOR COLD WEATHER OPERATIONS

[75] Inventors: J. Bradley Cain, Almonte, Canada; Brian Farnworth, Soest, Netherlands

[73] Assignee: Her Majesty the Queen, Canada

[21] Appl. No.: 838,809

[22] Filed: Mar. 12, 1986

[51] Int. Cl.$^4$ .............................. B32B 7/00
[52] U.S. Cl. ..................... 428/252; 135/87; 428/246; 428/284; 428/285; 428/287; 428/913; 428/920; 428/102
[58] Field of Search ............. 428/102, 246, 252, 902, 428/920, 285, 287, 913, 284; 135/87

[56] References Cited
U.S. PATENT DOCUMENTS
4,500,592 2/1985 Lee et al. .......................... 428/246

Primary Examiner—James J. Bell
Attorney, Agent, or Firm—Stevens, Davis, Miller & Mosher

[57] ABSTRACT

The invention disclosed is a novel composite material useful in tent construction, particularly for cold-weather use. The novel composite includes an outer water-vapour permeable, substantially wind-proof layer, a thermal insulating layer adjacent the outer layer, a water-vapour barrier layer adhesively bonded to the thermal insulating layer and an inner water-absorbent layer which is preferably flame-resistant. Condensation problems which occur in tents used in cold-weather conditions are minimized by the provision of an inner water-absorbent layer which absorbs and directs condensed water-vapour to the tent floor.

11 Claims, 1 Drawing Figure

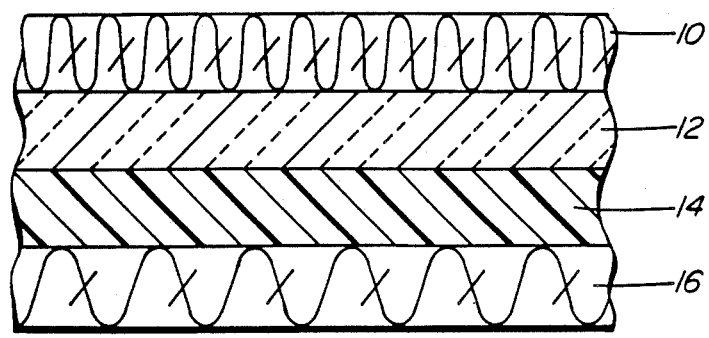

TENT LINERS/WALLS FOR COLD WEATHER OPERATIONS

This invention relates to thermal insulating materials, and in particular to a novel composite material which provides thermal insulation and minimized condensation problems when used in tent construction.

Operations in extreme weather conditions place a special demand on the performance of both men and equipment. Strong winds and low temperatures require the use of auxiliary heated shelters. Portable shelters such as tents require thermal insulation for both personal comfort and fuel economy.

Condensation of water vapour on the tent walls occurs due to the warm, moist interior air contacting the cooler tent wall. As the condensation accumulates it starts to drip, causing obvious discomfort for the occupants.

It is an object of the present invention to provide a novel composite material, particularly useful in tent wall construction for cold weather use.

It is a further object of the invention to provide such a composite material which provides thermal insulation and minimizes condensation problems.

According to the invention, a novel composite material is provided comprising:
 an outer water-vapour permeable, substantially wind-proof layer;
 a thermal insulating layer adjacent the outer layer;
 a water-vapour barrier layer adhesively bonded to the thermal insulating layer; and
 an inner water-absorbent layer.

In the drawing which illustrates a preferred embodiment of the invention, the FIGURE is a side-elevation in section which illustrates the arrangement of the various layers comprising the novel composite material according to the invention.

With specific reference to the sole FIGURE, the novel composite material according to the invention is seen to comprise an outer water-vapour permeable, substantially wind-proof layer 10.

Preferably, the outer layer 10 is made of a tightly-woven ripstop nylon fabric having a weight per unit area of about 0.09 kg/m².

This lightweight fabric is strong yet flexible even at low temperatures. The nylon provides mechanical strength required of tent materials and acts as a substantially "wind-proof" layer. The air permeability of this fabric is approximately 0.42 l/m²sPa and the water vapour permeability is approximately the equivalent of 0.22 cm of air which allows moisture to escape.

Adjacent to the outer layer is a thermal insulating layer 12, preferably in the form of a fibrous batting material, e.g. Polarguard, a trademark for a long-filament polyester fibrous batting material manufactured by Celanese which has a water vapour permeability approximately equivalent to 3.0 cm of air. Such long filament battings are preferred as the number of quilting points can be minimized, thereby maximizing the thermal insulation value of the assembly. Other materials which have comparable or better thermal resistivity to Polarguard and which require a minimum amount of quilting to remain in place are acceptable in general, for the heat insulating layer. Loose fibrous materials may be used. However, the disadvantage of these materials is that extensive quilting or baffling is required which reduces the thermal resistance or increases the assembly weight respectively. The insulating layer 12 provides most of the thermal insulation of the tent. The insulating layer also maintains an air-gap between the inner and outer walls even in gusting wind, and prevents the development of convection cells between the inner and outer walls. These two properties help to minimize the heat loss due to convection. Another property of the insulating layer is that it back-scatters infra-red radiation, thereby reducing the radiant heat loss through the insulation. Radiant heat transfer is often incorrectly neglected in the calculation of the total heat loss though it usually comprises approximately one-half of the total heat transfer through an insulating layer.

The thermal insulating layer 12 is adhesively bonded to a water-vapour barrier layer 14. The bonding keeps the thermal insulating material in place without the need for extensive quilting or baffles. Quilting can reduce the thermal insulation of a covering while the use of baffles would require more material and hence would add more weight to the tent.

The heat insulating layer 12 has been determined to have an appropriate thickness for tent applications. In general, the thickness will depend upon the amount of heat available to heat the tent, the desired temperature difference between outside and inside, the tent surface area and the acceptable limits on bulk and weight.

The preferred thickness of the heat insulating material for cold weather tent applications was determined experimentally to be about 2 cm, as follows. Burning fuels inside the tent for warmth and cooking produce several potentially dangerous gases. Carbon dioxide is one of the major products from combustion and prolonged exposure or high concentrations may be harmful. The Canadian Forces Mountain Stove produces approximately $1.1 \times 10^{-4}$ kg/s of carbon dioxide. To maintain a maximum concentration of 1% by volume of carbon dioxide in the tent, a volume flow rate of 6.1 l/s (STP) of fresh air is required. If the ambient air is at $-40°$ C. and the internal air temperature is at 15° C. this air exchange causes a heat loss of approximately 400 W. As the Mountain Stove nominally produces 1500 W of heat, 1100 W of heat is available to maintain the air temperature of the tent at 15°C. If it is assumed that the heat loss to the floor is negligible, the above figures indicate that the tent walls should have a thermal resistance of approximately 0.05 K/W. For a tent having a surface area of approximately 10 m² (neglecting the floor), the thermal resistance of the walls based on a unit area should be about 0.5 Km²/W.

Measurement of the assembled wall materials indicates that the wall has a thermal resistance on a unit area basis of 0.37 Km²/W. If it is assumed that the air boundary layers on the wall produce an additional insulating value of between 0.1 and 0.2 Km²/W, then this wall assembly appears to have, approximately, the proper thermal resistance for use with this heater. Further optimization of the thermal properties of the tent is possible should a lower capacity stove be used.

The water vapour barrier layer 14 is made of a water-vapour impermeable material which is flexible at low temperatures. The preferred material is aluminized Mylar, a trademark for a polyester film material. The aluminum coating is not thought to be particularly relevant to reducing heat loss in most cases. However, it may reduce the transmission of visible light to some degree. The coating may be on either side of the vapour-barrier. It is preferable to have the coating on the side opposite to the insulating layer, that is, toward the inside of the tent. The primary function of the aluminized Mylar layer 14 is to act as a vapour barrier between the warm, moist internal air of the tent and the cooler, drier insulating layer. The problem of frost accumulation on the test is greatly reduced if not eliminated by the use of the vapour barrier between the warm, moist internal air and the cool insulation. Thus, the tent may be used without an increase in weight or packed volume due to frost accumulation. The vapour barrier also minimizes condensation build-up in the insulation. The translucent aluminum coating on the Mylar acts as a light barrier. However, an observable amount of light still passes through the material. The translucent coating is thus particularly useful where tents are used at times where sleep is required during daylight, e.g., in Arctic regions.

The inner layer 16 of the composite is water-absorbent so as to minimize condensation problems in tent applications. The layer 16 is also preferably flame-resistant. The water-absorbent nature of this inner layer promotes wicking of the condensation to the lower regions of the tent or to the floor to minimize dripping onto the occupants. A suitable water-absorbent, flame-resistant material is Nomex. Nomex is a trademark for a heat-resistant nylon, the co-polymer of meta-phenylene diamine and isophthaloyl chloride manufactured by Dupont. The preferred Nomex material is a loosely woven version having a weight per unit area of about 0.11 kg/m$^2$.

When the novel composite material according to the invention is used in the manufacture of tents, the layers of the assembly are held together at the seams by stitching only. There are no other quilting seams involved. However, additional quilting may be required in large assemblies.

EXPERIMENTAL INVESTIGATION

Several laboratory experiments were performed on various tent prototypes and representative models to determine the heating properties, the flammability properties and the condensation characteristics of the novel composite material. These experiments and their results are discussed below.

Thermal Insulation

A full-size prototype High-Arctic Reconnaissance Tent (a conically-shaped tent, having a front semi-circular wall tapering to a smaller semi-circular back wall) made of a composite material, according to the invention was used in a cold-room to determine the heating characteristics of the tent for a no-wind condition. The tent was instrumented with thermistors, heat-flow discs and an electric, forced-air heater.

It was found that, for no wind with the upper and lower vents closed, the tent had an effective thermal resistance of 0.046 K/W. Thus, under similar conditions, for every watt of heat transferred to the tent, the internal air temperature of the tent will be raised 0.046 K (or Celsius) above the ambient temperature. The effect of wind on the heat transfer properties of the tent has not been evaluated to-date.

With both upper and lower vents open, the equivalent thermal resistance was reduced to 0.035 K/W as warm air escaped through the upper vent and was replaced by cold air entering through the lower vent at the foot of the tent. It should be noted that this test involves free convection ventilation which should only depend upon the temperature difference between the inside and outside air. The operational value of the equivalent thermal resistance will be highly dependent upon the ventilation rate, which will be a function of the wind velocity relative to the tent as well as the temperature difference between the inside and outside air.

The experimentally determined thermal resistance of the tent (0.046 K/W) is very close to the calculated optimum wall thermal resistance (0.05 K/W). The experimental value may be slightly low due to air leakage around the bottom of the tent, heat loss to the floor (which was neglected in theoretical calculation) or by the construction techniques. Theoretical calculations, indicate that a tent with a 55° C. temperature rise relative to the ambient temperature, having walls with a thermal resistance of 0.05 K/W and a ventilatory heat loss of 400 W would have an effective thermal resistance of approximately 0.037 K/W. This is in close agreement with the value of 0.035 K/W found experimentally.

The heat flow to the floor was measured locally to be 8 W/m$^2$. Assuming that this is representative of the entire floor area, the total heat loss to the floor is only 38 W, or 3% of the total 1350 W heat loss of the tent. The floor of the cold-room is thermally insulated. However, the floor of the tent is also insulated during field exercises by the occupants' sleeping bags. Thus, it is thought that the experimental setup is comparable to the actual setup of the tent in the field.

Flammability

In another experiment, insulation samples, similar in construction to the composite material according to the invention were tested in accordance with Canadian Government Specifications Board, Method 27.2—1977, "Flame Resistance - Surface Burning Test", CAN 2-4.2M77. A light-weight, polyester fabric was used as the outer material of the samples in place of the ripstop nylon of the novel composite. The samples were inclined at a 45 degree angle to the vertical with the inner flame-resistant layer directly exposed to an alcohol flame.

The nylon outer layer of the sample, the batting and aluminized Mylar all melted away from the flame. Some congealing of these materials was observed on the specimens after the experiment. The inner flame-resistant layer remained intact, although it was severely scorched. Thus, in the tent, the inner layer acts as a barrier between the melted outer fabrics and the interior of the tent. In a tent fire, the molten insulation could drip onto occupants or sleeping bags if it were not for the inner flame-resistant layer. Without the flame-resistant layer, the dripping, molten insulation could cause burns or spread the fire to sleeping bags and clothing.

In accordance with the reporting practices of the above standard test, the prototype tent wall material, as assembled, was judged to be "Moderately Flame Resistant" when the inner surface was exposed to flame. No afterflame or afterglow was observed. The maximum char width was 4.1 cm and some melting of the outer materials was observed.

Condensation

As previously discussed, the innner layer of the novel composite material minimizes dripping of condensation onto tent occupants by promoting the wicking of condensation from the upper regions of the tent wall to the lower regions. To test this hypothesis, a domed model (not shown) with a rectangular base was built using the novel composite material. On the one half of the roof, the inner layer was removed. The floor under the model was covered with paper upon which copper sulphate was spread. This blue crystalline material is soluble in water. Auxiliary heat was supplied at a rate of 13 W. The ambient temperature was approximately −15° C. These conditions were chosen based on conditions experienced during preliminary field trials in which condensation dripping was observed. The resulting internal air temperature of the model was approximately 31° C. greater than the ambient temperature, i.e. 10° C. greater than that observed during the field trials. When water dripping occurred, the dissolved chemical stained the paper, recording the area in which dripping occurred as well as the intensity of the dripping.

Over a period of several hours, condensation occurred and water dripped from the model roof to the floor. It was observed that the side of the model in which the inner layer was removed dripped considerably more than did the other side. Around the edge of the side which included the inner layer a build-up of water at the floor wall juncture was evident. The results of this experiment support the hypothesis that the inner water-absorbent layer of the novel composite material promotes wicking thereby minimizing dripping from the roof.

The embodiments of the invention in which an exclusive property or privilege is claimed is defined as follows:

1. A composite material comprising:
    an outermost water-vapour permeable, substantially wind-proof layer;
    a thermal insulating layer adjacent the outermost layer;
    a single water-vapour barrier layer adhesively bonded to the thermal insulating layer; and
    an innermost water-absorbent layer.
2. A composite material according to claim 1, wherein the thermal insulating layer is of a fibrous batting material.
3. A composite material according to claim 2, wherein the inner water-absorbent layer is also flame-resistant.
4. A composite material according to claim 3, wherein water-vapour barrier layer is of a polyester film material.
5. A composite material according to claim 4, wherein the polyester film material is translucent.
6. A composite material according to claim 5, wherein the polyester film material is coated with aluminum on the side opposite to the heat insulating layer.
7. A composite material according to claim 6, wherein the outer layer is of a tightly woven nylon fabric material having a weight per unit area of about 0.09 kg/m$^2$.
8. A composite material according to claim 7, wherein the fibrous batting material is of long filament polyester material.
9. A composite material according to claim 8, wherein the inner material is a heat-resistant nylon material.
10. A composite material according to claim 9, wherein the nylon material is a co-polymer of meta-phenylene diamine and isophthaloyl chloride.
11. A tent made of the composite material as defined in claim 3.

* * * * *